(12) United States Patent
Finkle et al.

(10) Patent No.: US 6,370,085 B1
(45) Date of Patent: Apr. 9, 2002

(54) EXTENDABLE HULL-MOUNTED SONAR SYSTEM

(75) Inventors: Jonathan Finkle; Stephen G. Greineder, both of East Greenwich, RI (US); Raymond J. Rowland, Noank, CT (US); Roy E. Tozier, Portsmouth, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/923,258

(22) Filed: Aug. 3, 2001

(51) Int. Cl.⁷ .............................................. H04R 17/00
(52) U.S. Cl. ...................... 367/173; 367/130; 367/153
(58) Field of Search ................................. 367/106, 130, 367/173, 129, 153

(56) References Cited

U.S. PATENT DOCUMENTS

| | | | |
|---|---|---|---|
| 5,602,801 A | * | 2/1997 | Nussbaum et al. ......... 367/165 |
| 5,717,658 A | * | 2/1998 | Carter ........................ 367/173 |
| 5,737,279 A | * | 4/1998 | Carter ........................ 367/173 |
| 6,046,963 A | * | 4/2000 | Glenning .................... 367/188 |
| 6,052,335 A | * | 4/2000 | Korolenko .................. 367/121 |

* cited by examiner

Primary Examiner—Ian J. Lobo
(74) Attorney, Agent, or Firm—Michael J. McGowan; Prithvi C. Lall; Michael F. Oglo

(57) ABSTRACT

A system to extend transducer arrays from the hull of a vessel while it is underway provides for increased array gain, volumetric aperture (very large aperture arrays), and rejection of hull-bound noise for submarines, surface ships, weapons, and unmanned underwater and surface vehicles. A plurality of arms extend radially outwardly from the hull of a submarine, and passive and/or active elements of the arrays are mounted around the hull on the arms, trail in the water from the arms, or extend between different ones of the arms or between arms and the hull. The system of arms and the array are folded into elongate recesses in the hull to lower noise during higher speed transit by the submarine. The arrays can be made up of sensors and/or projectors of radar, sonar signals, optical energy, vibrational energy, magnetic influence, temperature, etc., and combinations of these sensors.

21 Claims, 3 Drawing Sheets

EXTENDABLE HULL-MOUNTED SONAR SYSTEM

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

Not applicable.

BACKGROUND OF THE INVENTION (1) Field of the Invention

The present invention relates generally to hull-mounted sonar systems. More particularly, this invention relates to a hull-mounted system to extend the location of arrays from the hull to improve performance.

(2) Description of the Prior Art

Undersea craft, such as submarines use spherical arrays, towed arrays, and other hull-mounted arrays for sonar sensors. The size of a spherical array on a submarine is traditionally limited to roughly the diameter of the submarine's hull. While acceptable performance levels are provided for, an increased capability for sonar detection and tracking performance is always desired, especially in the forward and rearward looking directions. Currently, the size of the array (volumetric aperture), flow noise, and blockage due to the physical location of the array on the hull, are limiting influences on sonar performance. In addition, hull-mounted sonar sensors often are subject to hull-borne vibrations and noises Thus, in accordance with this inventive concept, a need has been recognized in the state of the art for a system for laterally extending sonar arrays from a submarine to provide significant increases in array aperture in all directions, and to fold up the arrays into grooves in the hull to reduce noise during transit.

SUMMARY OF THE INVENTION

The first object of the invention is to provide an improvement for a system for deploying and towing at least one sonar array.

Another object of the invention is to provide a system to extend sonar transducer arrays radially outwardly from a longitudinal axis of a submarine to improve its performance.

Another object of the invention is to provide a structure that extends arrays of transducers laterally from a submarine to improve performance thereof and folds along the hull to reduce noise during transit at higher speeds.

Another object of the invention is to provide an extendable, hull-mounted sonar system to increase detection, classification, and localization performance particularly in the forward and rear directions and have improved self-noise measurement.

Another object of the invention is to provide for improved detection for avoidance of mines, ocean-bottom sensing, under-ice sensing, sensing of incoming radar and laser signals, and EMI and RFI signals.

Another object of the invention is to provide for increased array gain, volumetric aperture, and hull-borne noise rejection for submarines, surface ships, weapons, and unmanned underwater and surface vehicles.

Another object of the invention is to provide a system for deploying towed arrays from and/or between each arm of deploying structure to maintain high-resolution capabilities in forward, aft, and side-looking directions.

Another object of the invention is to provide an improved system for deploying arrays using either natural, or biasing tension of the arms of the array or cables to deploy radially extendable arms.

Another object of the invention is to provide a system for deploying transducer arrays arranged in a three-dimensional umbrella-like volume.

Another object of the invention is to provide a system for deploying arrays capable of transmitting active acoustic and non-acoustic energies and detecting passive and active acoustic energy as well as non-acoustic energy at low, mid, and high frequencies, and monitoring and canceling ship/hull self-generated noise.

Another object of the invention is to provide a system for deploying arrays from a submarine at all positions from fully radially deployed to completely stowed in grooves on the hull of the submarine to provide for sensing while underway or stopped.

Another object of the invention is to provide a system for deploying arrays in deep water, shallow water, or shallow bottom depth by adjusting the extension of the structural arms.

These and other objects of the invention will become more readily apparent from the ensuing specification when taken in conjunction with the appended claims.

Accordingly, the present invention provides a system to extend at least one array from the hull of a submarine while it is in motion. A plurality of biased arms extend radially outwardly from the hull in circumferentially, nominally equal-distantly-spaced relationships from one another, and passive and/or active transducer elements of arrays are optionally mounted on the arms, trail in the water from the arms, or extend between different ones of the arms or between arms and the hull. The system of arms and transducer arrays are folded into elongate longitudinal grooves in the hull or within some other fairinglike structures on the hull to lower noise during higher speed transit by the submarine.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals refer to like parts and wherein.

DESCRIPTION OF THE PREFERRED EMBODIMENTS

Figure 1:
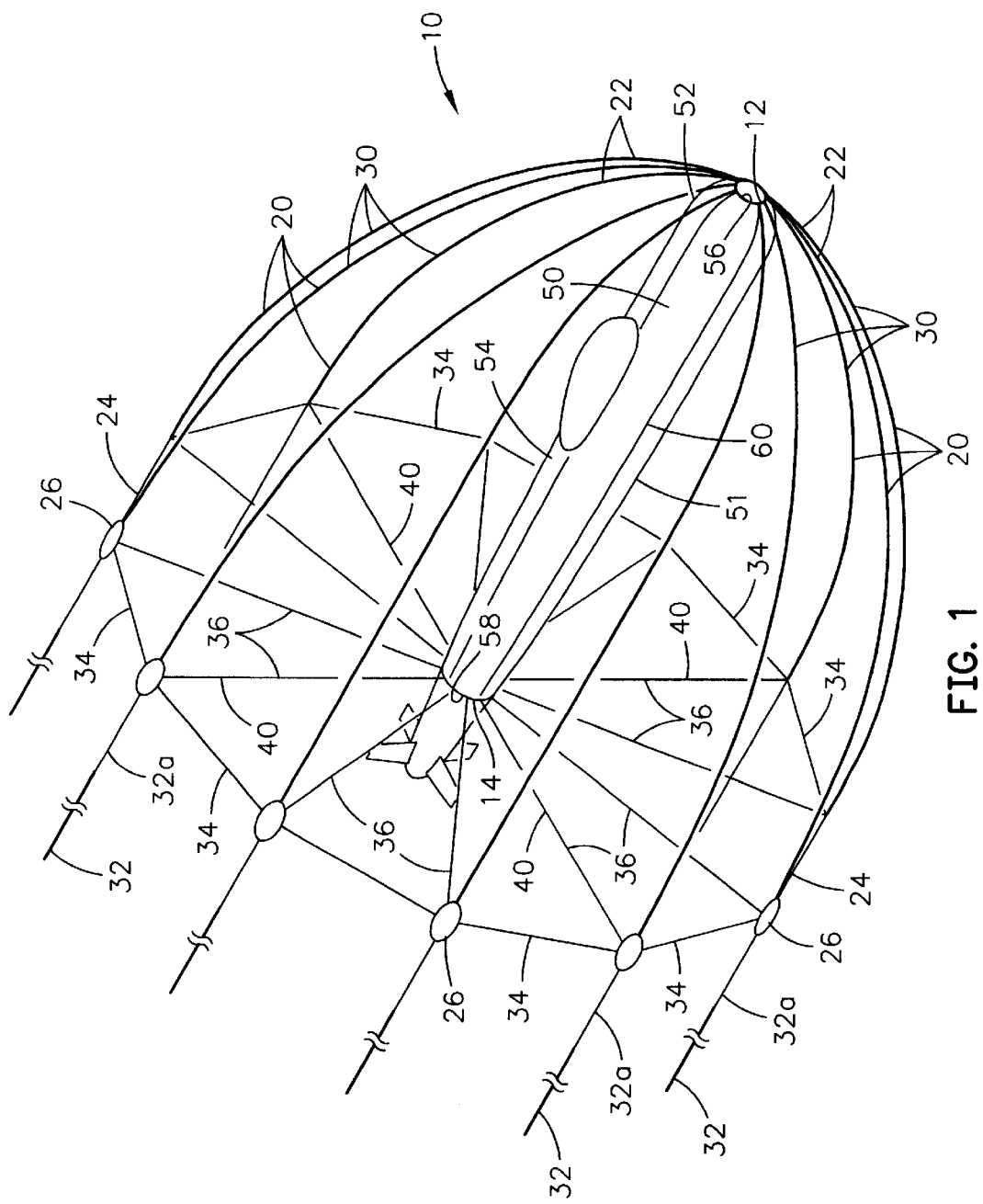
FIG. 1 is an isometric view of the system of this invention mounted on a submarine while underway.

Referring to FIG. 1, umbrella-like system 10 is shown operationally deployed in an extended position to increase detection, classification, and localization and other sensor function performances, particularly in forward and aft looking directions from a suitable platform, such as submarine 50. System 10 in accordance with this invention also can be provided on other platforms including surface ships, weapons, and unmanned underwater and surface vehicles to enhance these performance capabilities in diverse applications.

System 10 has a forward ring-shaped support 12 secured to forward portion 52 on outer hull 54 of submarine 50 in a forward annular recess 56, and ring-shaped support 12 secures a plurality of arms, or arms 20 to outer hull 54. Arms 20 are made from a flexible and resilient material, such as spring steel, fiberglass, or composites, for example, that exerts a force that biases, or urges arms 20 to extend radially outwardly from longitudinal axis 51 and hull 54 of submarine 50 in circumferentially, nominally equal-distantly-spaced relationships from one another. This relationship of arms 20 can be changed and adapted to accommodate different hull designs and missions as the case may be. Arms 20 have a stronger, or reinforced section 22 of the biased material to reduce and distribute concentrations of stresses and strains in each arm 20 and help them remain extended while submarine So is underway.

Each of arms 20 has a first array 30 of at least one, but probably many transducers, that may include acoustic projectors and/or sensors (hydrophones) appropriately mounted along their length and face forward, sideward, and/or aft. The transducers, or sensors for first array 30 additionally may include sensors for temperature, salinity, electromagnetic energy projection and detection (antennas), etc. System 10 additionally has one or more nominally neutrally buoyant second arrays 32 each connected to an end portion 24 of each arm 20 to trail along behind end portions 24 in streamer-like fashion that will not droop or hang askew across the water flow. Each second, or trailing array 32 also may be made up of a variety of one or many transducers that may include acoustic projectors or sensors (hydrophones) and/or sensors of temperature, salinity, electromagnetic energy projection and detection (antennas), etc. Arrays 32 are likely to be in an elongated hose-like structure that also contains their power and signal transmission leads and possibly a dielectric fluid. The power and signal transmission leads from these arrays and others to be described below extend to and through the inner pressure hull (not shown) of submarine 50 to monitors and computer systems (not shown) for signal processing, use, storage, and/or transmission to distant stations.

Some of the transducers of first and second arrays 30 and 32 can be disposed along the arrays and appropriately oriented and/or shaded to monitor self-generated noise of submarine 50 and system 10. This feature gives awareness so that improvements in the design of submarine 50 and system 10 can be made and gives real-time indications at preferred operational speeds to monitor and minimize any own-ship radiated signals.

Individual fish-line-like towing cables 32a may be interposed between end portions 24 and second arrays 32 so that second arrays 32 can be towed through the water at least several hundred feet behind submarine 50 and thus isolated from much of the turbulence and own-ship noise created during passage. Trailing second arrays 32 and cables 32a can be extended from storage compartments (not shown) within arms 20 during their deployment, and these arrays can be pulled into these compartments for stowage when data gathering is completed, or high-speed departure is called for.

Figure 2:
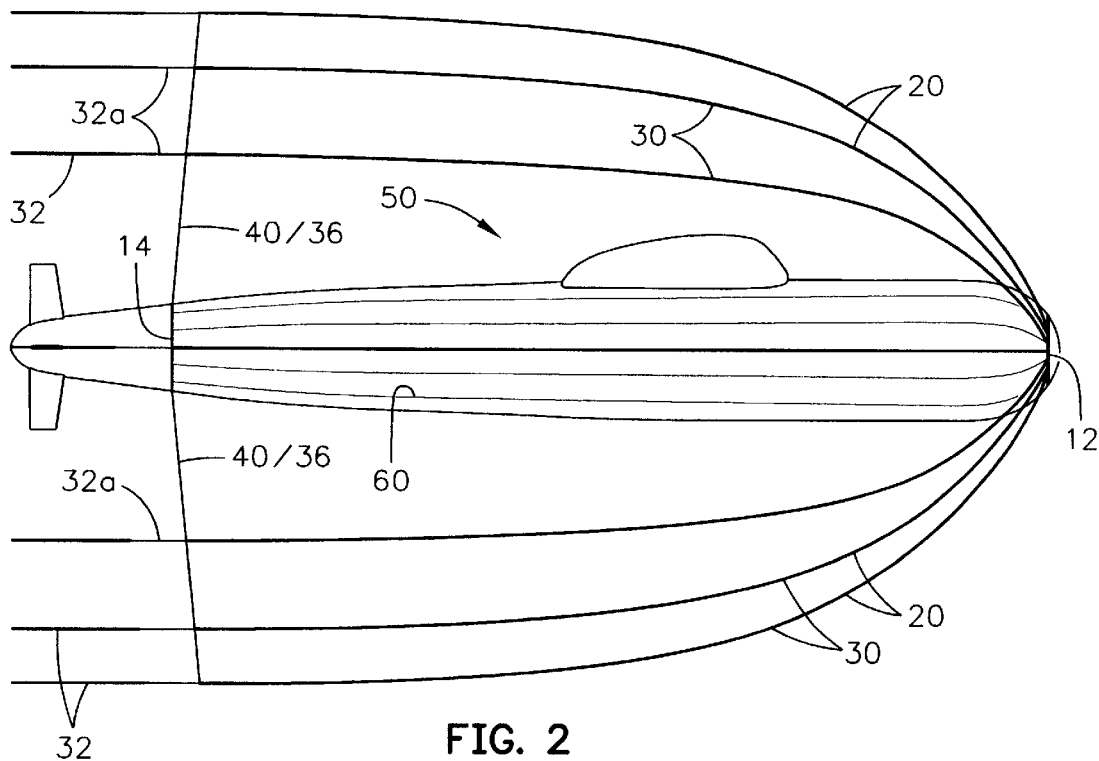
FIG. 2 is a side view of the system of this invention partially deployed or during higher speed transit by the submarine.

A cable 40 is connected between an aft ring-shaped support 14 in an aft annular recess 58 in hull 54 and each end portion 24 of each arm 20. Ring-shaped support 14 may have internal windlasses (not shown) associated with it that are each connected to a separate cable 40 and are controlled from within submarine 50 to each selectively pay out and retrieve each cable 40, or a single windlass associated with support 14 might be connected to all cables 40 to are simultaneously and equally pay-out or reel-in cables 40. When cables 40 are payed-out from windlasses of ring-shaped support 14, the biasing of the material of arms 20 causes them their associated arrays 30 and 32 and cables 40 to radially extend outwardly from longitudinal axis 51 in circumferentially, nominally equal-distantly-spaced relationships from one another to the fully extended position as shown in FIG. 1. This extension of arms 20 and first and second arrays 30 and 32 will be maintained at a predetermined design speed (about five knots) so that arrays 30 and 32 can transmit, receive, and sense data. When speed of submarine 50 is increased beyond the design speed, or if cables 40 are partially retrieved, or reeled-in by windlasses of aft ring-shaped support 14, the biasing force of the biasing material of arms 20 is overcome, and each arm 20 bends, and arrays 30 and 32 are pulled toward and closer to hull 54, see FIG. 2 in conjunction with FIG. 1. This shape of arms 20 and their sensors of first and second arrays 30 and 32 might be created and maintained by reeled-in cables 40 or the flow of seawater during higher speed transit.

Preferably, during higher speed transit, each interconnected cable 40 can be reeled-in more completely on its windlass of aft ring-shaped support 14 and each second array 32 and cable 32a are pulled, or retracted into their respectively interconnected arm 20. Then, further reeling-in of each cable 40 causes each of arms 20 with its stowed array 32 and exposed array 30 to be stowed in a separate one of a plurality of elongated longitudinal grooves 60 in hull 54, see FIG. 3 in conjunction with FIGS. 1 and 2. Each longitudinal groove 60 is sized to receive and stow a separate arm 20 and arrays 30 and 32. Stowage of arms 20 and arrays 30 and 32 in longitudinal grooves 60 reduces flow noise that would otherwise be created if they were left outside hull 54. Since transducers, including sensors and projectors, of array 30 may be exposed to the ambient water, they can remain activated to receive and/or transmit data while arms 20 and arrays 30 and 32 are stowed in longitudinal grooves 60. This feature allows submarine 50 to have multi-array sensing along the longitudinal length of hull 54 while at rest or any speed underway.

Optionally, aft ring-shaped support need not be at the aftmost position on submarine 50 but could be located somewhat forward. This option allows arms 20, their associated arrays and grooves 60 to be shorter with a consequent reduction in aperture that may be adequate for less demanding data-gathering needs.

An active lifting structure 26 can be mounted on each of end portions 24 of arms 20 (only a few are shown to avoid cluttering the drawings). Lifting structure 26 has vane-like surfaces (not shown) that hydro-dynamically react with the flow of water during transit of submarine 50. This reaction creates a force that augments the biasing force of arms 20 to assist the radial displacement of arms 20 from longitudinal axis 51 to their fully extended position. A compartment (not shown) may be contained in each lifting structure 26 to deploy and stow each array 32 and towing cable 32a. When lifting structures 26 are used, a suitable stowage recess 60a is provided adjacent to each groove 60 in hull 54 to receive the lifting structures during high-speed transit.

In addition to first arrays 30 on arms 20 and second arrays 32 trailing behind arms 20, system 10 can have third arrays 34 of transducers that may include projectors and sensors transversely extending between different ones of arms 20, and fourth arrays 36 of transducers that may include projectors and sensors that can be supported on cables 30 where they reach between end portions 24 of arms 20 and aft ring-shaped support 14. Arrays 34 and 36 may be retracted, or pulled into arms 20 and aft ring-shaped support 14 when need be. This composite arrangement of arrays 30, 32, 34, and 36 can be selectively tailored with sensors, spacing, weighting, and orientation to assure gathering of discrete data from different sources of interest within the three-dimensional volumetric umbrella created by system 10. The transducers of arrays 30 and 32, and optionally arrays 34 and 36 provide a composite volumetric sensor array having an aperture of ten, twenty, or even thirty times the diameter of a spherical array that would fit inside the platform, in this case submarine 50.

System 10 can be back-fitted onto existing conventional submarines. In this case, the conventional submarine does not have forward annular recess 56 and aft annular recess 58 of submarine 50 supra. Instead, forward ring-shaped support 12 and aft ring-shaped support 14 are adapted to be slipped onto the outer forward and aft surfaces of the outer hull of the conventional submarine that are, generally speaking, tapered. Frictional engagement may be all that is needed, although additional attachment structure for clamping the supports on the hull may be needed. In addition, since the conventional submarine has no longitudinal grooves 60 as described with respect to submarine 50, the arms and arrays lie on the outer surface of the outer hull during high-speed transit, or suitable hull-mounted fairings might be added. Electrical power and data leads would be coupled through the inner pressure hull as described above. This capability would allow a conventional submarine to be temporarily fitted with system 10, which can be removed at the end of deployment, or left in a remote area as a remote monitoring station to transmit signals back to the submarine, surface ship, or other vessel. However, when system 10 is to be left to function as a remote station, a self-contained power supply, transmitter, and processing electronics, etc., must be left behind with it. When the array is being used while attached to the submarine, power and data is transmitted between the sub and the array via a suitable multi-function cable.

Figure 4:
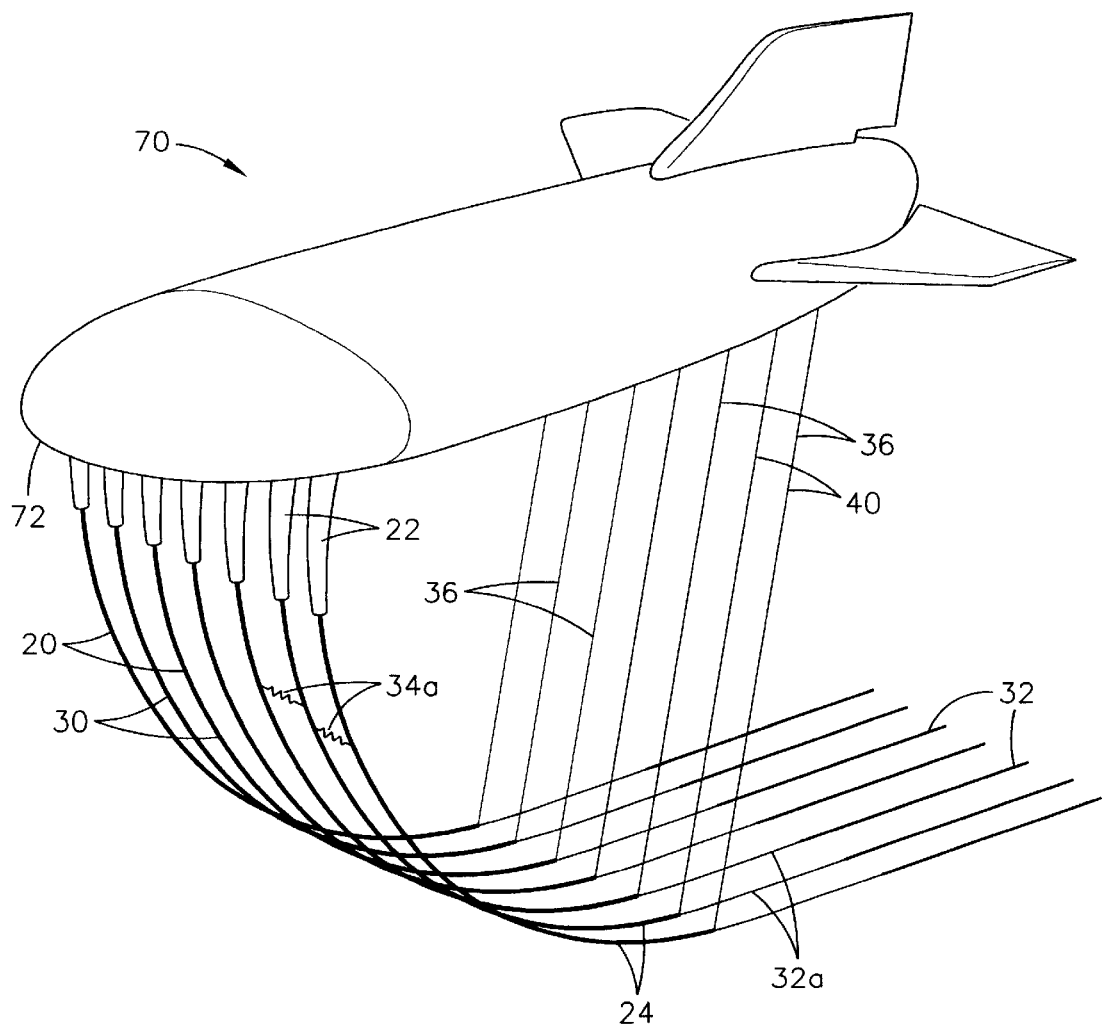
FIG. 4 is an isometric view of a modified system mounted on an unmanned undersea vehicle.

Referring to FIG. 4, another option for system 10 is to place it on autonomous or towed unmanned submersibles 70 (or surface craft) to improve their capabilities. An exemplary unmanned autonomous submersible 70 capable of remote preprogrammed or remotely controlled operations is depicted and has arms 20 with reinforced sections 22 and cables 40 deploying and retrieving one or more of arrays 30, 32 (and cables 32a), 34a, and 36 downwardly and outwardly from its bottom side 72. A sample application of this arrangement might be used to sense and map the location of mines so that they can be avoided, destroyed or otherwise dealt with. The arms and sensors could be extended otherwise for other sensing purposes. Another option would be to deploy other autonomous submersibles 70 having different packages of sensors and/or different orientations of arms and arrays to monitor different phenomena. Many operational options are available, such as, letting such submersibles 70 lie on the bottom for some time, and then activate them to monitor a region or launch an attack. A towed design might also be used; however, it might be better to tow such a submersible 70 behind and to the side of a towing vessel to avoid activation of ordnance by the towing craft. System 10 in accordance with this invention is a welcome modification for unmanned craft, because they usually are smaller and inherently have a limited acoustic apertures and related acoustic capabilities. Thus, system 10 can be modified with different arrays at different orientations to selectively expand the capabilities of these unmanned craft.

Figure 3:
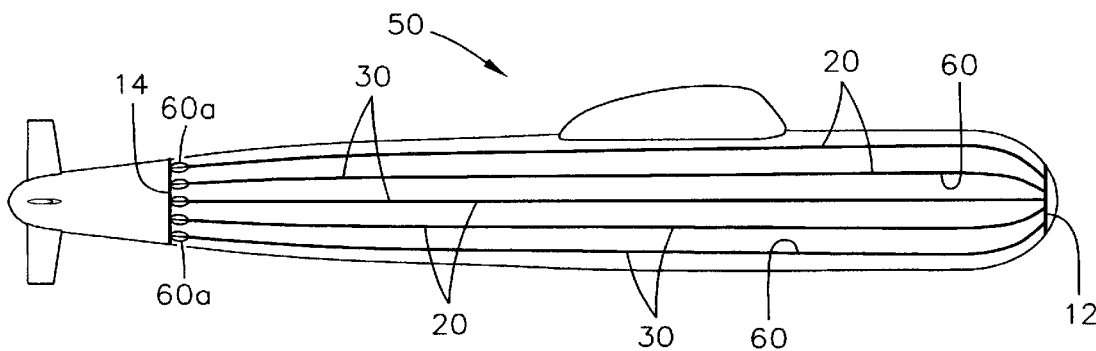
FIG. 3 is an isometric view of the arms and the array closed and stowed in longitudinal grooves, or recesses on the outer hull of the submarine for high-speed transit.

Referring to FIG. 3, the deployment sequence of system 10 first, has arms 20 stowed in longitudinal grooves 60. Next, arms 20 are extended radially outwardly from longitudinal axis 51 of submarine 50 either by the natural biasing action or tensile stiffness of the biasing material of arms 20 and/or the force produced by active lifting structures 26 hydro-dynamically reacting with the flow of water as submarine 50 is underway, see FIG. 2. Gear systems or pneumatic piston structure inside of hull 54 might be made available to help radially outwardly displace arms 20. FIG. 1 shows first array 30 in its fully deployed (open) position, and second, third and fourth arrays 32, 34, and 36 are extended and deployed in a three-dimensional umbrella-like volume. Retrieval of arms and arrays calls for reversing this sequence. Arrays are retracted and cables 40 are reeled-in to pull the arms and arrays into longitudinal grooves 60 into the stowed position.

System 10 in accordance with this invention provides increased detection, classification, and localization performance in forward and rearward looking directions, and gives improved self-noise measurement for submarines, surface ships, weapons, and unmanned underwater and surface vehicles. System 10 also allows for increased array gain, volumetric aperture (very large aperture arrays), and rejection of hull-borne noise over existing submarine sonar and other sensor systems. When various sensors are mounted on this device it can also be used as a platform for mine avoidance, ocean bottom sensing, under ice sensing, radar detection, laser detection, and electromagnetic/radio detection. Each arm 20 can additionally deploy towed second arrays 32 of transducers which may include sensors and projectors to detect passive and active acoustic energy as well as non-acoustic energy at low, mid, and high frequencies. System 10 of arrays of sensors can monitor ship/hull own self noise and can fully use its sensors even when in the fully stored position. System 10 can deploy lines of hydrophone arrays or other sensors strung between arms 20 for detection purposes and can deploy its sensor arms 20 at any position from fully deployed to fully stored in grooves, even while the submarine (or other vessel) is moving forward through the water. System 10 can use its sensors even when in the fully stored position and adapts for use in deep water, shallow water, or shallow bottom depth by adjusting the deployment of the individual arms. System 10 reduces drag caused by the flow of water at higher speeds due to bending of arms 20 with the flow of water and maintains high resolution forward, rearward, and side-looking capabilities at all submarine (or other vessel) speeds.

Having the teachings of this invention in mind, modifications and alternate embodiments of this invention may be fabricated to have a wide variety of applications in other systems. For example, while system 10 is disclosed herein as a system of up to four arrays, it is clear that other configurations of arms 20 and arrays may be provided or the sensors in the arrays could be different within the scope of this inventive concept. One skilled in the art to which this invention pertains could make such modifications to accommodate different rates of dynamic flow of water past submarine 50 and still be within the scope of this invention.

The disclosed components and their arrangements as disclosed herein all contribute to the novel features of this invention. System 10 of this invention provides a reliable and cost-effective means to improve the capabilities of arrays of sensors for a vessel underway. Therefore, system 10 as disclosed herein is not to be construed as limiting, but rather, is intended to be demonstrative of this inventive concept.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A system to improve capabilities of transducers comprising:
    a plurality of arms mounted on a forward portion of a platform to extend radially outwardly therefrom, said arms being made from a biasing material to exert biasing force to overcome drag forces created by transit of said platform through a medium;
    a first array of transducers mounted on each of said arms;
    a second array of transducers coupled to an end portion of each of said arms to trail behind said end portion of each of said arms-as said platform moves through said medium; and
    a plurality of cables, each connected to a separate one of said end portions to allow said biasing force of each of said arms to extend each of said arms radially outwardly from said platform and to overcome said biasing forces and bend each of said arms to bring each first and second arrays toward said platform.

2. The system of claim 1 further comprising:
    a forward ring-shaped support secured to said forward portion said platform having said arms secured thereto to extend said arms, arrays and cables radially outwardly from said platform and said forward ring-shaped support in circumferentially, equal-distantly-spaced relationships from one another.

3. The system of claim 2 further comprising:
    an aft ring-shaped support mounted in an aft annular recess on an outer hull of said platform, each of said cables being connected between said aft ring-shaped support and a separate one of said end portions of a separate one of said arms to selectively pay-out and retrieve said cables to extend said arms, arrays and cables radially outwardly from said platform and said aft ring-shaped support in circumferentially, equal-distantly-spaced relationships from one another.

4. The system of claim 3 further comprising:
    a plurality of parallel longitudinal grooves on the surface of said platform to each receive separate interconnected arms, arrays, and cables therein during transit, said cables being reeled-in to draw said arms, arrays, and cables into said longitudinal grooves.

5. The system of claim 4 further comprising:
    a towing cable interposed between each end portion and said second array to trail each second array at least nominally several hundred feet behind each said end portion during transit of said platform through said medium.

6. The system of claim 5 further comprising:
    third arrays of transducers each transversely extending between different ones of said arms.

7. The system of claim 6 further comprising:
    fourth arrays of transducers each supported on a separate one of said cables extending between separate ones of said end portions of said arms and said aft ring-shaped support.

8. The system of claim 5 wherein:
    said platform is a submarine, said medium is seawater, and said arms, first and second arrays and cables define a three-dimensional volumetric umbrella of transducers.

9. The system of claim 8 wherein:
    some of the transducers of said first and second arrays are appropriately oriented to monitor self-generated noise of said submarine and said system to provide for improvements thereof and real-time indications of preferred operational speeds.

10. The system of claim 9 wherein:
    said transducers of said first and second arrays provide a composite volumetric sensor array having an aperture of ten, twenty, or even thirty times the diameter of a spherical array that would fit inside said submarine.

11. The system of claim 7 wherein:
    said platform is a submarine, said medium is seawater, and said arms, first, second, third and fourth arrays, and said cables define arrays, and cables define a three-dimensional volumetric umbrella of transducers.

12. The system of claim 11 wherein:
    some of the transducers of said first, second third and fourth arrays are appropriately oriented to monitor self-generated noise of said submarine and said system to provide for improvements thereof and real-time indications of preferred operational speeds.

13. The system of claim 12 wherein:
    said transducers of said first, second, third and fourth arrays provide a composite volumetric sensor array having an aperture of ten, twenty, or even thirty times the diameter of a spherical array that would fit inside said submarine.

14. The system of claim 13 further comprising:
    active lifting structures each mounted on a separate one of said end portions to augment said biasing force.

15. The system of claim 10 further comprising:
    active lifting structures each mounted on a separate one of said end portions to augment said biasing force.

16. A system to improve capabilities of transducers comprising:
    a plurality of arms mounted on a bottom side of a forward portion of a platform to extend downwardly and outwardly therefrom, said arms being made from biasing material exerting biasing force to overcome drag forces created by transit of said platform through a medium;
    a first array of transducers mounted on each of said arms;
    a second array coupled to an end portion of each of said arms to trail behind said end portion of each of said arms as said platform moves through said medium; and
    a plurality of cables, each connected to a separate one of said end portions to allow said biasing force of each of said arms to extend each of said arms downwardly and outwardly from said platform and to overcome said biasing forces and bend each of said arms to bring each first and second arrays toward said platform.

17. The system of claim 16 further comprising:
    a towing cable interposed between each end portion and said second array to trail each said second array behind each said end portion during transit through said medium.

18. The system of claim 17 further comprising:
    third arrays of transducers each transversely extending between different ones of said arms.

19. The system of claim 18 further comprising:
    fourth arrays of transducers each supported on a separate one of said cables extending between separate ones of said end portions of said arms and said aft ring-shaped support.

20. The system of claim 17 wherein:

said platform is unmanned, said medium is seawater, and said arms, first and second arrays and said cables define a three-dimensional volumetric umbrella of transducers.

21. The system of claim 19 wherein:

said platform is unmanned, said medium is seawater, and said arms, first, second, third and fourth arrays, and said cables define a three-dimensional volumetric umbrella of transducers.

* * * * *